No. 843,593. PATENTED FEB. 12, 1907.
C. A. FENN.
BACK PEDALING BRAKE.
APPLICATION FILED MAR. 2, 1906.
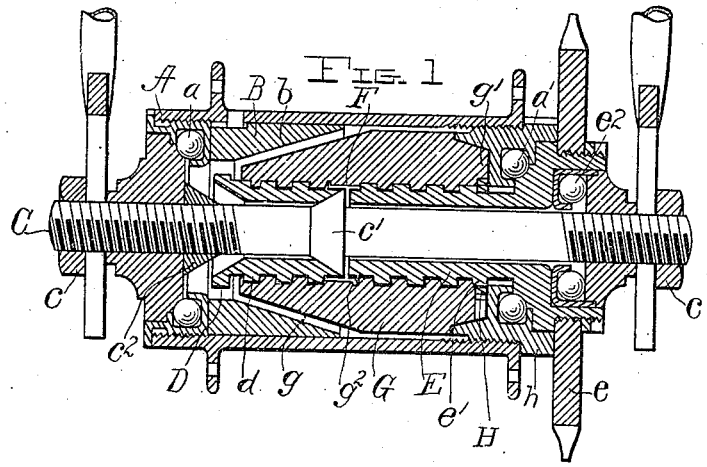
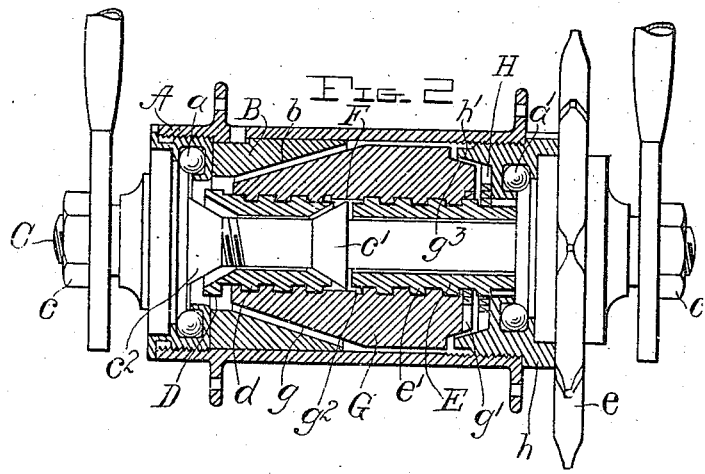
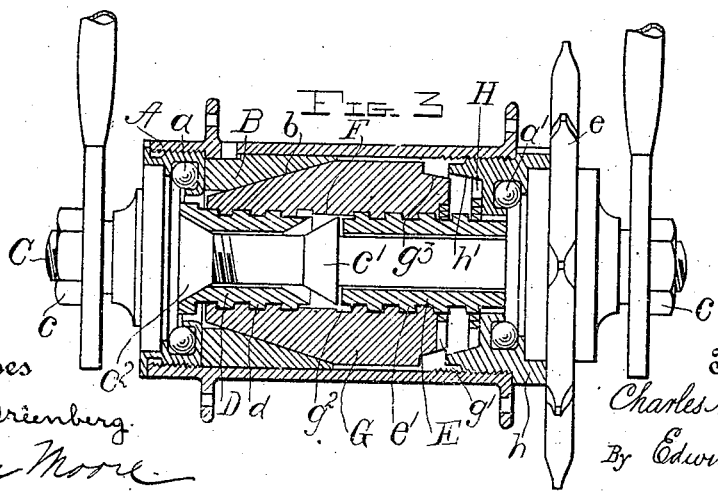
Witnesses
Louis Grienberg
S. Olivia Moore
Inventor
Charles Austin Fenn,
By Edwin Guthrie,
Attorney

UNITED STATES PATENT OFFICE.

CHARLES A. FENN, OF BLOOMINGTON, ILLINOIS.

BACK-PEDALING BRAKE.

No. 843,593.     Specification of Letters Patent.     Patented Feb. 12, 1907.

Application filed March 2, 1906. Serial No. 303,873.

*To all whom it may concern:*

Be it known that I, CHARLES AUSTIN FENN, a citizen of the United States, residing at Bloomington, in the county of McLean and State of Illinois, have invented certain new and useful Improvements in Back-Pedaling Brakes, of which the following is a specification.

My invention relates to back-pedaling brakes—that is to say, it belongs to the class of mechanisms usually comprised within the barrel or hub of the rear wheel of a bicycle and adapted when the pedals are controlled by the rider in suitable manner to drive the rear wheel and propel the bicycle or to permit the rear wheel to revolve freely, enabling the rider to "coast" and also to apply a braking effect upon the rear wheel when desired.

The object of my invention is the production of mechanism of the character stated including a minimum number of simple particularly formed and arranged parts with the view of reducing the cost of the invention originally and the necessity for repairs subsequently.

It is likewise an object of my invention to fashion a back-pedaling brake which possesses no other necessary connection with the rear fork or other portion of the frame than that afforded by the customary centrally-disposed threaded rod or spindle and the nuts engaging the ends of it.

The stated objects I accomplish by means of the details and their association as illustrated in the accompanying drawings, of which—

Figure 1 represents a section lengthwise of my invention, showing the parts in the positions asumed by them when acting to drive the bicycle. Fig. 2 is a section lengthwise of my invention with the parts arranged to permit the bicycle to coast. In other words, the rear wheel may revolve freely with respect to the mechanism within its hub casing or barrel. Fig. 3 is a section of my invention, showing the parts in braking position.

Like letters are used to refer to like elements throughout.

Considering the drawings, the letter A designates the hub casing or barrel, which revolves upon the suitably-arranged balls $a$ and $a'$ and is provided interiorly with a fixed hollow brake clutch-cylinder B, the internal wall of which (marked $b$) tapers substantially as shown.

The spindle or axis C is provided with the nuts $c$, engaging its threaded ends in the usual manner. The spindle has also a fixed conical and concentric enlarged portion $c'$ and an adjustable cone $c^2$. A sleeve D encircles the spindle between the cones, the mouths of the sleeve being correspondingly formed to fit the cones. The sleeve has also the external square threads $d$. Also encircling the spindle C is a second sleeve E, to which is attached the sprockets $e$, and the sleeve is provided exteriorly with the square threads $e'$. The sprocket end of the sleeve E rotates upon the suitably arranged and supported balls $e^2$. F marks the bore of sleeve E.

The letter G refers to the cylindrical one-piece brake and drive-shoe, which has part of its exterior $g$ cone-shaped and formed to fit the interior or hollow portion of the clutch-cylinder B, described above as fixed within the barrel A. The right-hand face or end of shoe G is provided with the clutch-teeth $g'$, and these teeth are constructed and arranged to engage corresponding teeth H in the ball-retainer $h$, which is fixed to the barrel A and revolves with it. The retainer $h$ carries the balls $a'$, already referred to as affording the bearing for the end of the barrel.

In the explanation of the operation of my invention let it be assumed that the parts are in the positions shown in Fig. 1—that is to say, with the clutch-faces engaged and the barrel A being driven by the sprocket $e$. If the pedals be now stopped, the continued movement of barrel A, carrying with it the brake-shoe G, will, by reason of the engagement of the right-hand threads $e'$ of sleeve E and the corresponding internal threads $g^2$ of the interior of the brake-block, move the brake-block to the left and disengage the clutch-surfaces. At the same time the friction clutch-surfaces $g^3$ and $h'$ are also disengaged, the barrel A will rotate freely, and the bicycle will coast. When the bicycle is coasting, the parts are relatively in positions as shown in Fig. 2. From the coasting position of the parts let it be desired to apply the brake. The rider back pedals, and the result is to force the shoe G to the left, and the sleeve D is also carried bodily to the left by reason of the engaging threads of that sleeve and shoe G. The adjustable cone $c^2$ limits the movement of sleeve D to left; but the back-pedaling effort of the rider turns shoe G in such manner as to screw it to the left upon the left-hand threads of the now frictionallyheld sleeve D. The conical end of the shoe G frictionally engages the corresponding surface $b$ of the clutch-cylinder B. That cylinder is revolving forwardly with the barrel A. Therefore by reason of its engagement the shoe G tends also to revolve with cylinder B, and if it did so revolve its engagement with the threads $e'$ of sleeve E would cause the shoe to jam in the conical seat or surface $b$; but shoe G also engages the left-hand threads $d$ of sleeve D, as explained and shown, and any forwardly-revolving tendency impressed on shoe G by the engagement with cylinder B is resisted by reason of the opposite effects of the threads $d$ and $e'$ upon the interior of shoe G. The shoe cannot, therefore, turn with the cylinder B, which rubs against it with greater or less friction, depending upon the force of the back-pedaling action mentioned. Thus it is thought to be clear that whatever braking effect the rider may desire can be applied by him at will. Let it be desired to again propel the bicycle forward. The rider pedals forwardly, and by reason of the engagement of the threads of sleeve E and shoe G the shoe is moved to the right, drawing with it the secondary sleeve D until the right-hand end of sleeve D engages the fixed cone $c'$. As a result the sleeve D is stopped and exerts a considerable retarding effort upon the rotative movement of shoe G, although not upon its bodily movement to the right. A rotative movement is naturally impressed upon shoe G when in its intermediate position by the forward pedaling. If the rotative movement were the same in velocity as the rotation of sleeve E, actuated by the rider, obviously there would be no further movement of shoe G to the right. Those rotations are, however, by no means the same, and the substantial retardation of the stopped sleeve D, in addition to the inertia of the shoe G, which is, as shown, a one-piece block of metal, enables the forward pedaling to quickly engage the frictional and clutch surfaces and teeth in driving relation.

It will be noted that no connection exists between the mechanism within barrel A and the fork or frame of the bicycle other than that afforded by the spindle and its nuts and that the interior elements are reduced to a minimum in number.

Having thus described my invention and explained the mode of its operation, what I claim is—

1. In a back-pedaling brake, the combination with a barrel having a brake-clutch cylinder fixed within it and provided with a tapering interior, of a spindle, the said spindle being provided with enlargements, sleeves encircling the spindle, a sprocket-wheel attached to one of said sleeves, and one sleeve being located between and adapted to rotatively engage the enlargements of the said spindle, the said sleeves having oppositely-formed threads exteriorly, and a brake-shoe having one end constructed to enter and engage the said brake-clutch, the said barrel being provided with means adapted to engage the remaining end of the said brake-shoe, and the said shoe being provided with internal threads arranged to engage the threads of the said sleeves.

2. In a back-pedaling brake, the combination with a barrel having a brake-clutch cylinder fixed within it and provided with a tapering interior, of a spindle, the said spindle being provided with conical enlarged portions, sleeves encircling the spindle, a sprocket-wheel attached to one of said sleeves, and one sleeve being located between and adapted to rotatively engage alternatively the enlargements of the said spindle, the said sleeves having oppositely-formed threads exteriorly, and a brake-shoe having one end constructed to enter and engage the said brake-clutch, the said barrel being provided with means adapted to engage the remaining end of the said brake-shoe, and the said shoe being provided with internal threads arranged to engage the threads of the said sleeves.

3. In a back-pedaling brake, the combination with a barrel having a brake-clutch cylinder fixed within it and provided with a tapering interior, of a spindle, the said spindle being provided with a fixed cone and an adjustable cone, sleeves encircling the spindle, a sprocket-wheel attached to one of said sleeves, and one sleeve being located between and adapted to rotatively engage the cones of the said spindle, the said sleeves having oppositely-formed threads exteriorly, and a brake-shoe having one end constructed to enter and engage the said brake-clutch, the said barrel being provided with means adapted to engage the remaining end of the brake-shoe, and the said brake-shoe being provided with internal threads arranged to engage the threads of the said sleeves.

4. In a back-pedaling brake, the combination with a combined drive and brake shoe, of a revoluble barrel having surfaces constructed and arranged to be alternately engaged by said shoe, a relatively stationary axis, sleeves arranged upon the axis and having opposite external threads, a sprocket-wheel secured to one of said sleeves, means borne by said axis whereby the longitudinal movements of another sleeve upon the said axis are limited and its rotation resisted, the said shoe having internal threads engaging the threads of said sleeves.

5. In a back-pedaling brake, the combination with a barrel having a brake-clutch cylinder fixed within it and provided with a tapering interior, of a spindle, a sleeve encircling the spindle, a sprocket attached to the end of said sleeve, the said sleeve having exterior threads, a combined drive and brake shoe having one end constructed to enter and engage the said hollow cylinder, and adjustable retarding means whereby the rotation of said shoe may be yieldingly retarded, the said barrel being provided with means adapted to engage the remaining end of the brake-shoe, and the said brake-shoe being provided with internal threads arranged to engage the threads of said sleeve.

In testimony whereof I affix my signature in presence of two witnesses.

CHARLES A. FENN.

Witnesses:
    A. L. REID,
    TELLIS A. HARPER.